Nov. 17, 1953        R. G. TREUTING        2,659,271
SILICON-GERMANIUM OBJECTIVE LENS
Filed Feb. 23, 1950

| f = 10.0 CM. | | | | f/2 |
|---|---|---|---|---|
| LENS | $n_{2.4}$ | Δ | RADII | THICKNESS |
| I | 3.447 | 306 | $R_1$ = +9.51 CM. | $t_1$ = .46 CM. |
| | | | $R_2$ = +28.03 CM. | |
| II | 4.078 | 128 | $R_3$ = +35.79 CM. | $S_1$ = .08 CM. |
| | | | $R_4$ = +18.53 CM. | $t_2$ = .31 CM. |

| f = 10.0 CM. | | | | f/1 |
|---|---|---|---|---|
| LENS | $n_{2.4}$ | Δ | RADII | THICKNESS |
| I | 3.447 | 306 | $R_1$ = + 8.47 CM. | $t_1$ = 1.5 CM. |
| | | | $R_2$ = +21.37 CM. | |
| II | 4.078 | 128 | $R_3$ = +29.76 CM. | $S_1$ = .45 CM. |
| | | | $R_4$ = +13.49 CM. | $t_2$ = .6 CM. |

INVENTOR
R. G. TREUTING
BY
Hugh S. Wertz
ATTORNEY

Patented Nov. 17, 1953

2,659,271

UNITED STATES PATENT OFFICE 2,659,271

SILICON-GERMANIUM OBJECTIVE LENS

Robert G. Treuting, Summit, N. J., assignor to Bell Telephone Laboratories, Incorporated, New York, N. Y., a corporation of New York Application February 23, 1950, Serial No. 145,827

5 Claims. (Cl. 88—57)

This invention relates to infra-red optical elements and more particularly to lenses of crystalline semiconductive materials. More specifically it concerns silicon and germanium which have high refractive indices with high dispersion and transparency for infra-red light of wavelengths longer than the photoelectric limits thereof.

The present invention is related to the copending application of H. B. Briggs, Serial No. 120,383, filed October 8, 1949, wherein the dioptic qualities of silicon and germanium are described.

Hitherto among materials transmitting usefully in the infra-red and utilized in devices operating there, refractive indices range from 1.38 for LiF to 1.53 for NaCl at wavelengths in the region of 2.0 microns. However, at these same wavelengths, the indices for silicon and germanium are approximately 3.458 and 4.116, respectively. Since the curvatures in a simple lens element, required to attain a given focal power, vary inversely, not as the index of refraction $n$ of the optical medium utilized, but as $(n-1)$, a lens of any particular focal length can be made of silicon with surface curvatures one-fifth those of NaCl, or of germanium with curvatures one-sixth those of NaCl.

The aberrations of a lens system—that is, the various ways in which it may fail faithfully to depict an object in the image space—are related to the curvatures of the refracting surfaces, in some cases varying as a high power of the latter. Therefore, it is usually desirable in such lenses to utilize highly refractive materials to minimize the necessary curvatures. The use of silicon and germanium in combination makes possible lenses operating in the infra-red, of higher correction and/or aperture than heretofore available.

It has been discovered that not only the indices of refraction, but also the dispersions, or variations of index of refraction with wavelength, of silicon and germanium have the same mutual relation as the crown and flint glasses used in visual objectives. This relationship makes possible a combination of the two metalloids in an achromatic, spherically corrected objective. A combination of these two elements therefore makes practicable high speed lenses of low curvature which are economical in space, weight and quantity of material. By way of example, lenses of this kind can have great utility in infra-red signaling systems.

It is an object of this invention to improve lenses for use in the infra-red and more particularly to provide a high transmission, high aperture, achromatic lens therefor of better correction than previously possible.

In accordance with the invention, these objects are realized by a lens system which utilizes silicon and germanium components. As an illustrative embodiment of the invention, there is provided a doublet lens comprising a meniscus-shaped component of silicon of positive power followed in the image direction by an axially aligned meniscus-shaped component of germanium of negative power, the components being separated by air space and both convex towards the object space. This provides an achromatized, spherically and comatically well-corrected, doublet objective lens.

Figure 1:
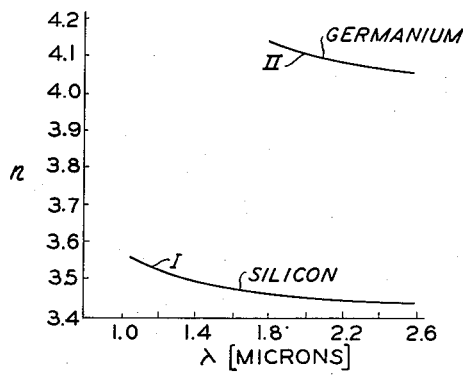
Fig. 1 is a graph showing the refractive indices of silicon and germanium plotted as a function of wavelength.

Referring more specifically to the drawings, Fig. 1 shows the refractive index as a function of wavelength for silicon and germanium. These values were derived in the manner well known in the art by means of an infra-red spectroscope. Curves I and II are for silicon and germanium, respectively. It is to be noted that in the neighborhood of two microns the dispersion of germanium is about three times that of silicon. The refractive index of silicon appears to approach the limit 3.44, that of germanium 4.06. In each, the dispersion is normal, the index varying inversely with the wavelength.

The germanium used in these measurements was prepared by the method disclosed by J. H. Scaff and H. C. Theuerer in their copending application, Serial No. 638,351, filed December 29, 1945, now Patent No. 2,602,211, dated July 8, 1952, to produce a material of which a substantial part has a purity resulting in an electrical resistivity in excess of 5 ohm-cm.; the silicon was prepared by the reduction of purified $SiCl_4$ with a suitable reagent, as for example, zinc, and subsequently fused as described in Patent 2,475,810 to H. C. Theuerer which issued on July 12, 1949, in such a manner as to produce a material, a substantial part thereof having a purity resulting in an electrical resistivity in excess of 2 ohm-cm. It is found that with both these materials the transparency to the infra-red increases with the purity. There have been obtained silicon having a purity resulting in an electrical resistivity up to 50 ohm-cm. and germanium having a purity resulting in an electrical resistivity up to 40 ohm-cm.

Some other characteristics of these semiconductors are: their surfaces are stable and readily shaped optically; they effectively filter out light from the near infra-red down to the remote ultra-violet; and they transmit effectively in the infra-red to at least fifteen microns.

Figure 2:
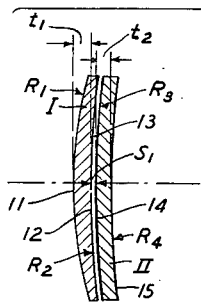
Figs. 2 and 3 show, as illustrative embodiments in accordance with the invention, well-corrected doublet objectives which have apertures of f/2 and f/1, respectively, for wavelengths in the infra-red.

Fig. 2 shows as an illustrative embodiment in accordance with the invention a doublet lens with a relative aperture of f/2. It comprises two axially aligned optical components I and II separated by an air space. In the direction from the object space to the image space, or from front to rear, the first component I is a positive silicon element of meniscus form with its surface of shorter radius of curvature 11, lying adjacent to the object space and that of longer radius 12, bounding in part the lens air space 13. The second component II is a negative germanium element of meniscus form in which the surface of longer radius of curvature 14, bounds in part the lens air space 13, and that of shorter radius 15, lies adjacent to the image space.

The specifications of the lens shown in Fig. 2 are as follows:

[f=10.0 cm.   f/2]

| Lens | $n_{2.4}$ | $\Delta$ | Radii | Thicknesses |
|---|---|---|---|---|
| I | 3.447 | 306 | $R_1 = +9.51$ cm. | $t_1 = .46$ cm. |
|   |       |     | $R_2 = +28.03$ cm. | $S_1 = .08$ cm. |
| II | 4.078 | 128 | $R_3 = +35.79$ cm. | $t_2 = .31$ cm. |
|   |       |     | $R_4 = +18.53$ cm. |   |

In the above table and on the accompanying drawing f refers to the focal length of the lens, the Roman numerals refer to the elements numbered from the front or object space, $n_{2.4}$ is the index of refraction calculated at 2.4 microns wavelength, $\Delta$ is the dispersive index which was derived in a manner to be described, R, t and S refer to the radii of curvature of the refractive surfaces, the thicknesses and the air spacings, and the subscripts on these refer to the surface, the elements and the spaces numbered respectively from the front, and the + signs in the radii column correspond to surfaces which are convex to the front.

The dispersion properties of optical glass are customarily expressed by the figure of merit, or dispersive index V, defined as $(n_d-1)/(n_F-n_c)$ where the $n$'s are the refractive indices at particular wavelengths in the range of visible light. However, since silicon and germanium are opaque to light in this range of wavelengths, the dispersive index as known in the optical glass art can have no meaning. However, for purposes of illustration, it becomes convenient to define an analogous quantity $\Delta$ therefor in the range of useful transmission of silicon and germanium. This has been done for the wavelengths chosen for achromatization 2.2 and 2.6 microns and for the intermediate wave length 2.4 microns which is approximately that of minimum focus.

The dispersive index $\Delta$ for germanium and silicon in this way is defined as:

$$\Delta = \frac{n_{2.4}-1}{n_{2.2}-n_{2.6}}$$

where the $n$'s are the refractive indices at the corresponding wavelengths. In this manner, the indices $\Delta$ for silicon and germanium are calculated as 306 and 128 respectively.

Figure 3:
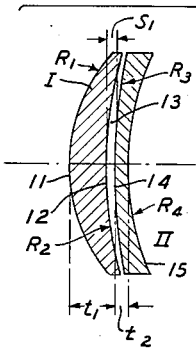

The specifications of the lens shown in Fig. 3 are as follows:

[f=10.0 cm.   f/1]

| Lens | $n_{2.4}$ | $\Delta$ | Radii | Thicknesses |
|---|---|---|---|---|
| I | 3.447 | 306 | $R_1 = +8.47$ cm. | $t_1 = 1.5$ cm. |
|   |       |     | $R_2 = +21.37$ cm. | $S_1 = .45$ cm. |
| II | 4.078 | 128 | $R_3 = +29.76$ cm. | $t_2 = .6$ cm. |
|   |       |     | $R_4 = +13.49$ cm. |   |

The same convention with regard to reference characters is used here as hereinabove for Fig. 2.

It will be noted that the doublet objective of this system also comprises a first positive component of silicon of meniscus form followed in the image direction by an axially aligned second negative component of germanium of meniscus form.

It is to be understood that the above-described lens arrangements are illustrative of the principles of the invention. Other such arrangements can be devised by one skilled in the art without departing from the spirit and scope of the invention. For example, a design can be incorporated toward the improvement of the field imagery by altering the axial imagery. Also by the use of a negative silicon component in combination with a positive germanium component, a dispersing system can be produced, or by proper neutralization, an afocal system. Wavelengths, other than those chosen here for purposes of illustration, can be selected for achromatization. It is also possible to include components of optical elements other than silicon or germanium having useful transmission in the infra-red spectral region concerned. Such addition can be used to reduce the secondary spectrum, as by achromatizing for an additional wavelength, or otherwise to improve the image quality by the reduction of aberrations by methods well known in the art.

What is claimed is:

1. An objective lens for wavelengths in the infra-red comprising two axially aligned optical elements each of which is transparent to wavelengths of light in the infra-red and substantially opaque to visible light, the first being of highly purified silicon having a purity resulting in electrical resistivity in excess of 2 ohm-centimeters and the second a component of highly purified germanium having a purity resulting in electrical resistivity in excess of 5 ohm-centimeters.

2. An objective lens according to claim 1 in which the first element is of positive power, and the second of negative power.

3. An objective lens comprising two axially aligned optical elements separated by air of which the first is of silicon and the second is of germanium in which the respective radii R, axial thicknesses t, and axial spacing s, numbered from the object space to the image space, are between the limits shown in the following table:

.3 f<$R_1$<1.0 f
2.0 f<$R_2$<3.0 f
2.4 f<$R_3$<4.5 f
1.2 f<$R_4$<2.0 f
.04 f<$t_1$<.16 f
.005 f<$s_1$<.05 f
.02 f<$t_2$<.08 f where f is the focal length of the objective.

4. An objective substantially as specified in the following table:

| Lens | Radii | Thicknesses |
|---|---|---|
| I | $R_1 = +.95 f$ | $t_1 = .05 f$ |
|  | $R_2 = +2.8 f$ | $S_1 = .01 f$ |
|  | $R_3 = +3.6 f$ | $t_2 = .03 f$ |
| II | $R_4 = +1.9 f$ |  | where the first column gives the lens elements in Roman numerals in order from the front, of which element I is of silicon and element II of germanium, R, t and S refer respectively to the radii of curvature of the refractive surfaces, the thickness of the elements, the subscripts on these refer to the surfaces, the elements, and the air space between the elements, the subscripts on these refer to the surfaces, the elements, and the spaces numbered consecutively from the front, f is the focal length of the objective, and the + signs correspond to surfaces which are convex to the front.

5. An objective substantially as specified in the following table:

| Lens | Radii | Thicknesses |
|---|---|---|
| I | $R_1 = +.85 f$ | $t_1 = .15 f$ |
|  | $R_2 = +2.1 f$ | $S_1 = .05 f$ |
|  | $R_3 = +3.0 f$ | $t_2 = .06 f$ |
| II | $R_4 = +1.3 f$ |  | where the first column gives the lens element in Roman numerals in order from the front, of which element I is of silicon and element II is of germanium, R, t and S refer respectively to the radii of curvature of the refractive surfaces, the thicknesses of the elements, and the spaces numbered consecutively from the front, f is the focal length of the objective, and the + signs correspond to surfaces convex to the front.

ROBERT G. TREUTING.

References Cited in the file of this patent

UNITED STATES PATENTS

| Number | Name | Date |
|---|---|---|
| 415,040 | Hastings | Nov. 12, 1889 |
| 576,896 | Rudolph | Feb. 9, 1897 |
| 1,541,407 | Spangenberg | June 9, 1925 |
| 1,607,817 | Dennis | Nov. 23, 1926 |
| 1,643,865 | Wiedert | Sept. 27, 1927 |
| 2,085,437 | Michelssen | June 29, 1937 |
| 2,158,507 | Konig | May 16, 1939 |
| 2,314,838 | Kingston | Mar. 23, 1943 |
| 2,425,403 | Sun | Aug. 12, 1947 |
| 2,453,218 | Grey | Nov. 9, 1948 |
| 2,512,257 | Pfund | June 20, 1950 |

OTHER REFERENCES

American Electro Chemical Society, vol. 89, 1946, pages 277 thru 289, "Technology of Germanium," published in New York city.